US009009163B2

(12) United States Patent
Hibino et al.

(10) Patent No.: US 9,009,163 B2
(45) Date of Patent: Apr. 14, 2015

(54) LAZY EVALUATION OF SEMANTIC INDEXING

(75) Inventors: Stacie L. Hibino, San Jose, CA (US); Mark D. Wood, Penfield, NY (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 257 days.

(21) Appl. No.: 12/633,266

(22) Filed: Dec. 8, 2009

(65) Prior Publication Data

US 2011/0137910 A1 Jun. 9, 2011

(51) Int. Cl.
G06F 7/00 (2006.01)
G06F 17/30 (2006.01)
G06F 17/00 (2006.01)

(52) U.S. Cl.
CPC ...... *G06F 17/30247* (2013.01); *G06F 17/3028* (2013.01)

(58) Field of Classification Search
CPC .............. G06F 17/30244; G06F 17/30247; G06F 17/30265; G06F 17/30864; G06F 17/30047; G06F 17/30017
USPC ........... 707/711, 715, 741, 999.001–999.005, 707/749, 748, 750
See application file for complete search history.

(56) References Cited

U.S. PATENT DOCUMENTS

| 5,594,641 | A  | * | 1/1997  | Kaplan et al. ....................... 1/1 |
| 5,963,940 | A  | * | 10/1999 | Liddy et al. ....................... 1/1 |
| 6,282,317 | B1 |   | 8/2001  | Luo et al. |
| 6,351,556 | B1 |   | 2/2002  | Loui et al. |
| 6,363,377 | B1 | * | 3/2002  | Kravets et al. ......... 707/999.004 |
| 6,504,951 | B1 |   | 1/2003  | Luo et al. |
| 6,606,411 | B1 |   | 8/2003  | Loui et al. |
| 6,697,502 | B2 |   | 2/2004  | Luo |
| 7,725,453 | B1 | * | 5/2010  | Chen et al. .................... 707/711 |
| 7,987,185 | B1 | * | 7/2011  | Mysen et al. .................. 707/733 |
| 2002/0078043 | A1 | * | 6/2002  | Pass et al. ......................... 707/6 |
| 2002/0147724 | A1 | * | 10/2002 | Fries et al. .................... 707/100 |
| 2003/0039410 | A1 | * | 2/2003  | Beeman et al. ............... 382/305 |
| 2003/0041058 | A1 | * | 2/2003  | Ibuki et al. ....................... 707/4 |
| 2004/0003746 | A1 |   | 1/2004  | Niemeyer et al. |
| 2004/0054661 | A1 | * | 3/2004  | Cheung et al. .................... 707/3 |

(Continued)

FOREIGN PATENT DOCUMENTS

WO    WO 2004/068300 A2    8/2004

OTHER PUBLICATIONS

Y. Qiu et al., "Concept-based query expansion," Proceedings of the 16th Annual International ACM SIGIR Conference on Research and Development in Information Retrieval, pp. 160-169, 1993.

(Continued)

*Primary Examiner* — Kannan Shanmugasundaram (57) ABSTRACT

A method for searching a database of digital media assets that has been indexed according to a set of general indexers. The method includes receiving a search query and defining specialized search conditions by identifying one or more elements of the search query corresponding to one or more specialized indexers. General search conditions are defined by identifying elements of the search query corresponding to the general indexers. A subset of the digital media assets are identified by applying the general search conditions, and the subset of the digital media assets is indexed using the identified specialized indexers. The subset of the digital media assets are ranked by applying the specialized search conditions.

27 Claims, 8 Drawing Sheets

(56) References Cited

U.S. PATENT DOCUMENTS

| | | | |
|---|---|---|---|
| 2004/0103090 A1* | 5/2004 | Dogl et al. ................. | 707/3 |
| 2005/0105775 A1 | 5/2005 | Luo et al. | |
| 2005/0105776 A1 | 5/2005 | Luo et al. | |
| 2005/0278378 A1* | 12/2005 | Frank ..................... | 707/104.1 |
| 2006/0069675 A1* | 3/2006 | Ogilvie ..................... | 707/3 |
| 2006/0224562 A1* | 10/2006 | Yan et al. ................ | 707/2 |
| 2007/0088695 A1* | 4/2007 | Bleyendaal et al. ........ | 707/5 |
| 2007/0133947 A1* | 6/2007 | Armitage et al. .......... | 386/95 |
| 2008/0005105 A1* | 1/2008 | Lawler et al. .............. | 707/6 |
| 2008/0046406 A1* | 2/2008 | Seide et al. ............... | 707/3 |
| 2008/0059886 A1* | 3/2008 | Grossman ................. | 715/733 |
| 2008/0222143 A1* | 9/2008 | Backer et al. ............. | 707/5 |
| 2009/0070302 A1* | 3/2009 | Moraleda et al. .......... | 707/3 |
| 2009/0171938 A1* | 7/2009 | Levin et al. ............... | 707/5 |
| 2009/0287676 A1* | 11/2009 | Dasdan .................... | 707/5 |
| 2010/0124378 A1 | 5/2010 | Das et al. | |

OTHER PUBLICATIONS

Z. Gong et al., "Web Query Expansion by WordNet," 16th International Conference on Database and Expert Systems Applications, Lecture Notes in Computer Science 3588, pp. 166-175, 2005.

U.S. Appl. No. 12/273,600, filed Nov. 19, 2008 entitled Method for Event-Based Semantic Classification; Inventors: Madirakshi Das, Alexander C. Loui and Mark D. Wood.

\* cited by examiner

| Still Images |
|---|
| capture date |
| shutter speed |
| f-stop |
| latitude & longitude |
| capture location |
| scene type |
| material types |
| detected objects |
| detected faces |
| recognized people |
| past usage |
| favorites rating |
| caption |
| ... |

⎱ 400

| Events |
|---|
| start time |
| end time |
| location |
| caption |
| event type |
| ... |

| | | | |
|---|---|---|---|
| Social Gathering | | | |
| | Party | | |
| | | | *Wedding* |
| | | | *Graduation* |
| | | | *Birthday* |
| | | | Bachelor |
| | | | Prom |
| | | | Holiday |
| | Family Moment | | |
| | | | *Baby pictures* |
| | | | *Family group shots* |
| Sports | | | |
| | Outdoor Sports | | |
| | | | *baseball* |
| | | | football |
| | | | *tennis* |
| | Indoor Sports | | |
| | | | *hockey* |
| | | | squash |
| | Water Sports | | |
| | | | *swimming* |
| | | | *diving* |
| Vacation | | | |
| | | Weekend get-away | |
| | | Cruise | |
| | | Camping | |
| | | Daytrip | |

LAZY EVALUATION OF SEMANTIC INDEXING

FIELD OF THE INVENTION

This invention pertains to the field of searching collections of digital media assets and more particularly to a method for identifying digital media assets using a search query having general and specialized elements.

BACKGROUND OF THE INVENTION

With the growth in popularity of digital imaging, users often amass large collections of digital media assets, including digital still images and digital videos. One of the primary challenges with accessing digital media assets from media collections relates to processing linguistic-based queries against non-linguistic data. Many of the solutions that have been proposed to address this challenge focus on extracting semantic or numeric metadata from the digital media assets and then processing queries against such metadata. For example, algorithms exist to automatically index a collection by semantic concepts such as location (e.g., beach, urban), event type (e.g., vacation, party), and the presence and identity of people. While adding more indexers can increase the potential for a system to answer a wider variety of queries, there are drawbacks to running too many indexers. Indexers can be computationally expensive to run and adding too many rarely used indexes can clutter a metadata database rather than enhance it. As more indexers become available, the challenge is to identify what indexers should be run. While some general indexers might be required to answer commonly asked queries, indexers required for less common queries may depend on individual users. For example, a query for a "cat" might be common for a cat owner, but might never be used by someone who does not own a cat.

SUMMARY OF THE INVENTION

The above-described problems are addressed and a technical solution is achieved in the art by a system and method for searching a database of digital media assets, comprising using a processor to perform the steps of:

designating a database of digital media assets, wherein the database of digital media assets has been indexed according to a set of general indexers to determine general metadata for each of the digital media assets;

receiving a search query;

defining specialized search conditions by identifying one or more elements of the search query corresponding to one or more specialized indexers;

defining general search conditions by identifying elements of the search query corresponding to the general indexers;

identifying a subset of the digital media assets by applying the general search conditions to the general metadata;

indexing the subset of the digital media assets using the one or more identified specialized indexers to determine specialized metadata for each of the digital media assets in the subset of the digital media assets; and ranking the subset of the digital media assets by applying the specialized search conditions to the specialized metadata.

In some embodiments, the specialized metadata resulting from processing one query are stored and subsequent specialized search conditions only require running specialized indexers for media where the specialized metadata is not already available.

In some embodiments, concept expansion is used to identify query elements related to general and/or specialized search conditions. Such concept expansion could be achieved, for example, through ontological reasoning or through obtaining linguistic relationships such as hypernym, hyponym, synonym, and meronym between concepts in natural language.

This invention has the advantages of saving metadata storage, eliminating unnecessary computation and matching specialized indexers to user-indicated interests.

In addition to the embodiments described above, further embodiments will become apparent by reference to the drawings and by study of the following detailed description.

DETAILED DESCRIPTION OF THE INVENTION

In the following description, some embodiments of the present invention will be described in terms that would ordinarily be implemented as software programs. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components, and elements known in the art. Given the system as described according to the invention in the following, software not specifically shown, suggested, or described herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

The phrase, "digital media asset," as used herein, refers to any digital media object, such as a digital still image, digital video file or digital audio file; as well as complex objects composed of such objects, including albums, playlists, and collections of objects into groups corresponding to particular events (e.g., a birthday party or a vacation).

Figure 1:
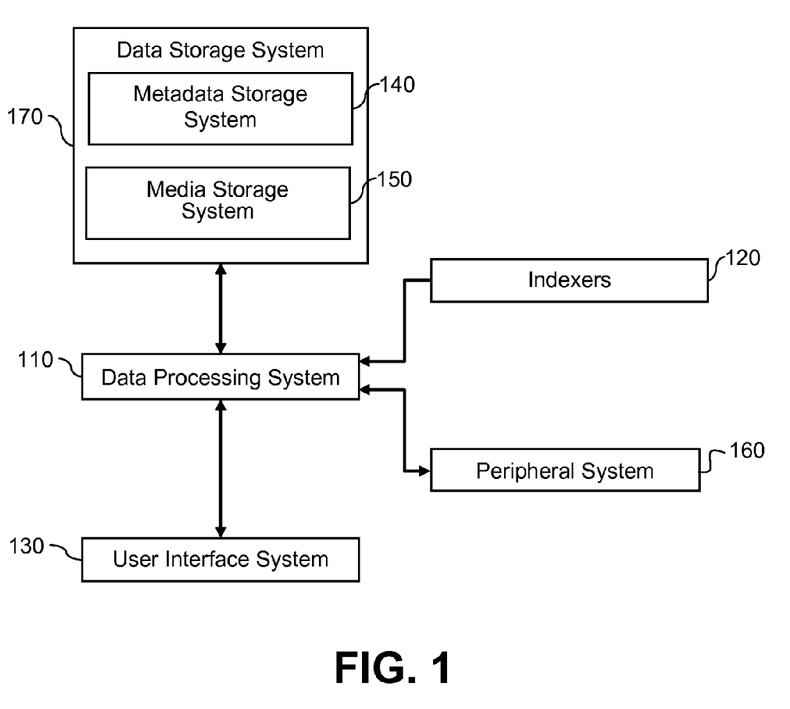
FIG. 1 is a high-level diagram showing the components of a system for receiving and processing image queries according to an embodiment of the present invention.

FIG. 1 is a high-level diagram showing the components of a system for searching a media collection of digital media assets according to an embodiment of the present invention. The system includes a data processing system 110, a peripheral system 160, a user interface system 130, a set of one or more indexers 120, and a data storage system 170. The data storage system 170 includes two subcomponents: a metadata storage system 140 and a media storage system 150. The various system components are communicatively connected to the data processing system 110.

The data processing system 110 includes one or more data processing devices that implement the processes of the various embodiments of the present invention, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The data storage system 170 includes one or more processor-accessible memories configured to store information, including the information needed to execute the processes of the various embodiments of the present invention, including the example processes described herein. The data storage system 170 may be a distributed processor-accessible memory system including multiple processor-accessible memories communicatively connected to the data processing system 110 via a plurality of computers or devices. On the other hand, the data storage system 170 need not be a distributed processor-accessible memory system and, consequently, may include one or more processor-accessible memories located within a single data processor or device. The data storage system may be implemented using any of a number of storage techniques, or combination thereof.

The data storage system 170 stores both the media collection of digital media assets, as well as metadata pertaining to such assets. These objects may be stored in two separate subsystems, such as the metadata storage system 140 and the media storage system 150, as shown in FIG. 1. The media storage system 150 may represent each digital media asset as a separate file in a file system. Alternatively, it may store each digital media asset as an object in a database, such as a relational database, or it may use any other storage mechanism known to those skilled in the art. The metadata storage system 140 contains metadata about the objects stored in the media storage system 150. The metadata storage system 140 may be implemented using any of a number of storage techniques, including but not limited to relational databases, object-oriented databases, triplestore databases, distributed databases, or other storage representations known to those skilled in the art. Furthermore, the metadata may also be stored within the digital media objects themselves (e.g., as EXIF metadata in a digital image file), and would therefore be part of the media storage system 150.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated. The phrase "communicatively connected" is intended to include a connection between devices or programs within a single data processor, a connection between devices or programs located in different data processors, and a connection between devices not located in data processors at all. In this regard, although the data storage system 170 is shown separately from the data processing system 110, one skilled in the art will appreciate that the data storage system 170 may be stored completely or partially within the data processing system 110. Further in this regard, although the peripheral system 120 and the user interface system 130 are shown separately from the data processing system 110, one skilled in the art will appreciate that one or both of such systems may be stored completely or partially within the data processing system 110.

The peripheral system 160 may include one or more devices configured to provide digital content records to the data processing system 110. For example, the peripheral system 160 may include digital still cameras, digital video cameras, cellular phones, or other data processors. The data processing system 110, upon receipt of digital content records from a device in the peripheral system 160, may store such digital content records in the media storage system 150.

The user interface system 130 may include a mouse, a keyboard, another computer, or any device or combination of devices from which data is input to the data processing system 110. In this regard, although the peripheral system 160 is shown separately from the user interface system 130, the peripheral system 160 may be included as part of the user interface system 130. The user interface system 130 also may include a display device, a processor-accessible memory, or any device or combination of devices to which data is output by the data processing system 110.

The present invention will now be described with reference to FIG. 2. In the illustrated embodiment, an index media collection step 210 is executed by the data processing system 110 (FIG. 1) to index a media collection 200 stored on the media storage system 150 (FIG. 1) using a set of general indexers 205, forming an indexed media collection 215.

Indexers are operators that generate descriptive metadata for a given digital media asset. The indexers may generate the descriptive metadata based upon an analysis of the digital media asset (e.g., processing of pixel data for a digital image). Alternately, the indexers may generate the descriptive metadata based upon an analysis of previously generated metadata associated with the digital media asset, or based on user-generated metadata or preferences (e.g., manual tagging of objects in a digital media asset, manual user rating of an asset, or usage of a digital media asset). Indexers may also generate the descriptive metadata using any combination of asset analysis, previously generated metadata, and user-generated metadata.

In the context of the present invention, general indexers 205 are defined to be indexers that are routinely applied to all digital media assets, or all assets of a particular category, independent of any particular search query. Examples of general metadata that would commonly be generated by general indexers 205 would include date/time metadata, event classification metadata, indoor/outdoor metadata, person detection metadata or geospatial metadata.

Specialized indexers 255 are indexers that due to their cost or other considerations are not routinely applied to all digital media assets as part of the index media collection step 210, but rather are only run on an as-needed basis.

Figure 3:
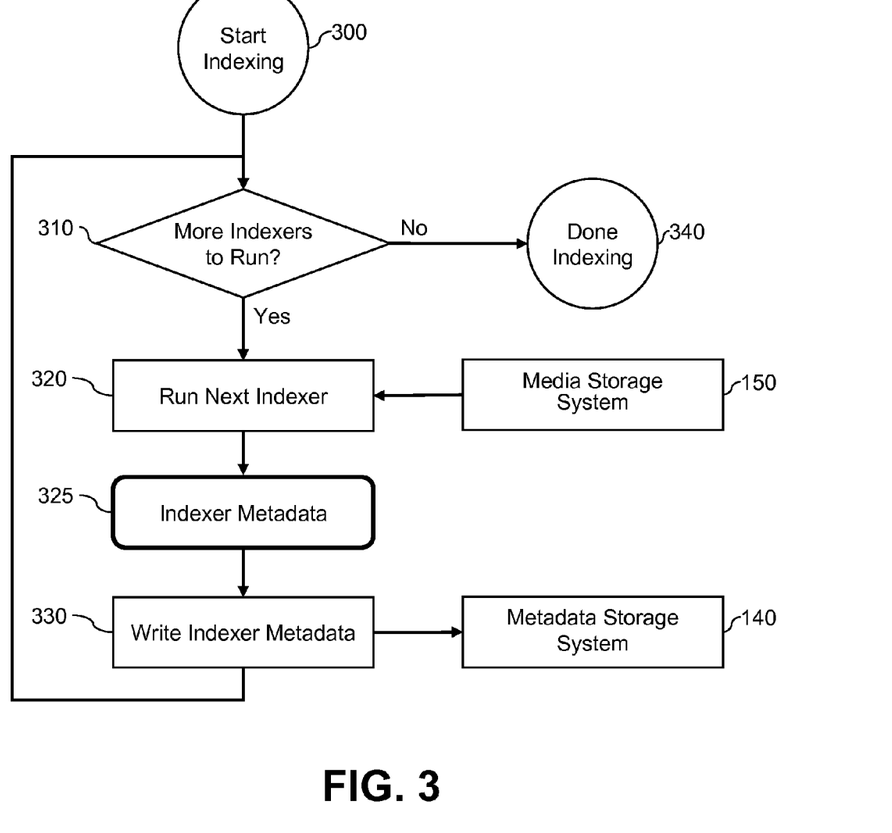
FIG. 3 is a flow diagram illustrating the steps in indexing a media collection stored on a media storage system using a set of indexers according to an embodiment of the present invention.

A process that can be used to apply a set of general indexers 205 to a media collection 200 as part of the index media collection step 210 is further illustrated in FIG. 3. For this embodiment, the data processing system 110 is used to execute each indexer in turn. This process is initiated at start index step 300. A more indexers test 310 is used to test whether there are more indexers to run. A run next indexer step 320 is used to apply an indexer to the digital media assets in the media collection 200 stored in the media storage system 150. The output of the indexer is indexer metadata 325 which is stored in the metadata storage system 140 using write indexer metadata step 330. The flow then returns to the more indexers test 310 to determine whether there are additional indexers to run. When all of the indexers have been run, flow passes to the done indexing step 340.

Depending upon the capabilities of the data processing system, the indexers may be run sequentially, or they may be run in parallel. The results of some general indexers 205 may depend upon the data processing system having previously run one or more general indexers 205, in which case the data processing system must run the indexers in the appropriate sequence.

As mentioned earlier, some indexers involve analyzing existing metadata stored with the digital media asset to produce new metadata. Examples of types of existing metadata that may have been previously recorded with digital media files and can be useful for various indexers would include time of capture metadata, exposure settings metadata, or geospatial location metadata. Such metadata is typically captured at the time of media acquisition by the capture device and recorded as part of the media data using a file format such as Exif, MPEG7, or the QuickTime MOV file format. Existing metadata may also have been manually provided by the user, such as through a system for tagging pictures. Indexers may also retrieve metadata for a digital media asset from other systems that may contain metadata about that digital media asset, or a copy thereof. Such systems include but are not limited to online sharing sites such as the Kodak Gallery or Facebook.

Indexers that can be used to index media collections 200 include a wide range of indexers, with new types of indexers continuously being developed. They include scene classifiers, such as algorithms for detecting certain broad or specific scene categories, such as beach, sky, outdoor, mountain or nature. They also include material classifiers for detecting certain types of materials, such as water or snow. Exemplary details of scene classifiers are described in U.S. Pat. No. 6,282,317 entitled "Method for automatic determination of main subjects in photographic images"; U.S. Pat. No. 6,697, 502 entitled "Image processing method for detecting human figures in a digital image assets"; U.S. Pat. No. 6,504,951 entitled "Method for Detecting Sky in Images"; U.S. Patent Application Publication No. 2005/0105776 entitled "Method for Semantic Scene Classification Using Camera Metadata and Content-based Cues"; U.S. Patent Application Publication No. 2005/0105775 entitled "Method of Using Temporal Context for Image Classification"; and U.S. Patent Application Publication No. 2004/003746 entitled "Method for Detecting Objects in Digital image assets."

Another class of indexers classify a set of such digital media assets as belonging to a particular event type, such as party, vacation, sports or family moment. An example of a typical event recognition algorithm that can be used in accordance with the present invention can be found in commonly assigned co-pending U.S. patent application Ser. No. 12/273, 600, entitled "Method for Event-Based Semantic Classification," which is incorporated herein by reference. Other types of indexers include those that attempt to analyze a series of digital media assets to determine relationships between the individual media assets. These indexers often organize the series of digital media assets into "event structures," corresponding to groups of digital media assets associated with a particular event; these event structures can themselves be considered to be new digital media assets. An example temporal event clustering algorithm is described in detail in commonly assigned U.S. Pat. No. 6,606,411 entitled "A method for Automatically Classifying Images Into Events," issued Aug. 12, 2003, and commonly assigned U.S. Pat. No. 6,351, 556, entitled "A Method for Automatically Comparing Content of Images for Classification Into Events", issued Feb. 26, 2002.

Indexers that generate new digital media assets that represent, for example, grouping or structural information, may not store such composite digital media assets in the media storage system 150 but may simply represent such digital media assets as objects within the metadata storage system 140. Alternatively, some composite digital media assets such as playlists or slideshows may be represented both as digital media objects within the media storage system 150 together with associated metadata in the metadata storage system 140.

In one embodiment of the present invention, the index media collection step 210 (FIG. 2) is performed within the system that is searching the media collection. However, in other embodiments some or all of the general indexers 205 that are associated with the index media collection step 210 may be run outside of the system. In this case, the metadata produced by the general indexers 205 are recorded in some accessible location, such as by adding new metadata fields to the digital image files. In either case, the general indexers 205 are generally run ahead of time and the resulting metadata stored so that it will be available when a user initiates a search query.

Figure 4:
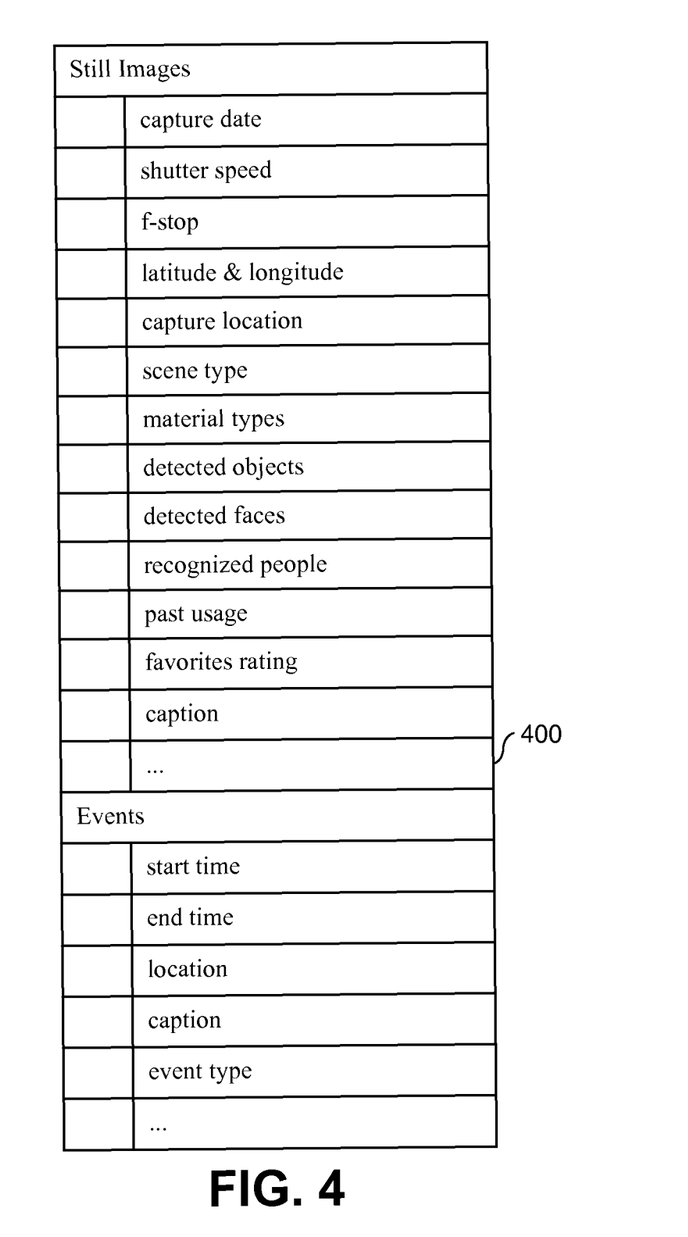
FIG. 4 is a table illustrating the types of metadata that may be associated with different digital media assets.

FIG. 4. illustrates a metadata table 400 illustrating some of the possible types of metadata that might be associated with still images or with event objects. Some of these metadata fields are typically populated at the time that a digital media asset is created (e.g., capture date, shutter speed, f-stop), while others are generated by applying the various types of indexer algorithms (e.g., material types, detected objects) and others are user-supplied (e.g., favorites rating, caption). Other types of digital media assets such as video and audio assets may contain some of the same types of metadata, as well as additional types of metadata unique to the asset type.

Figure 7:
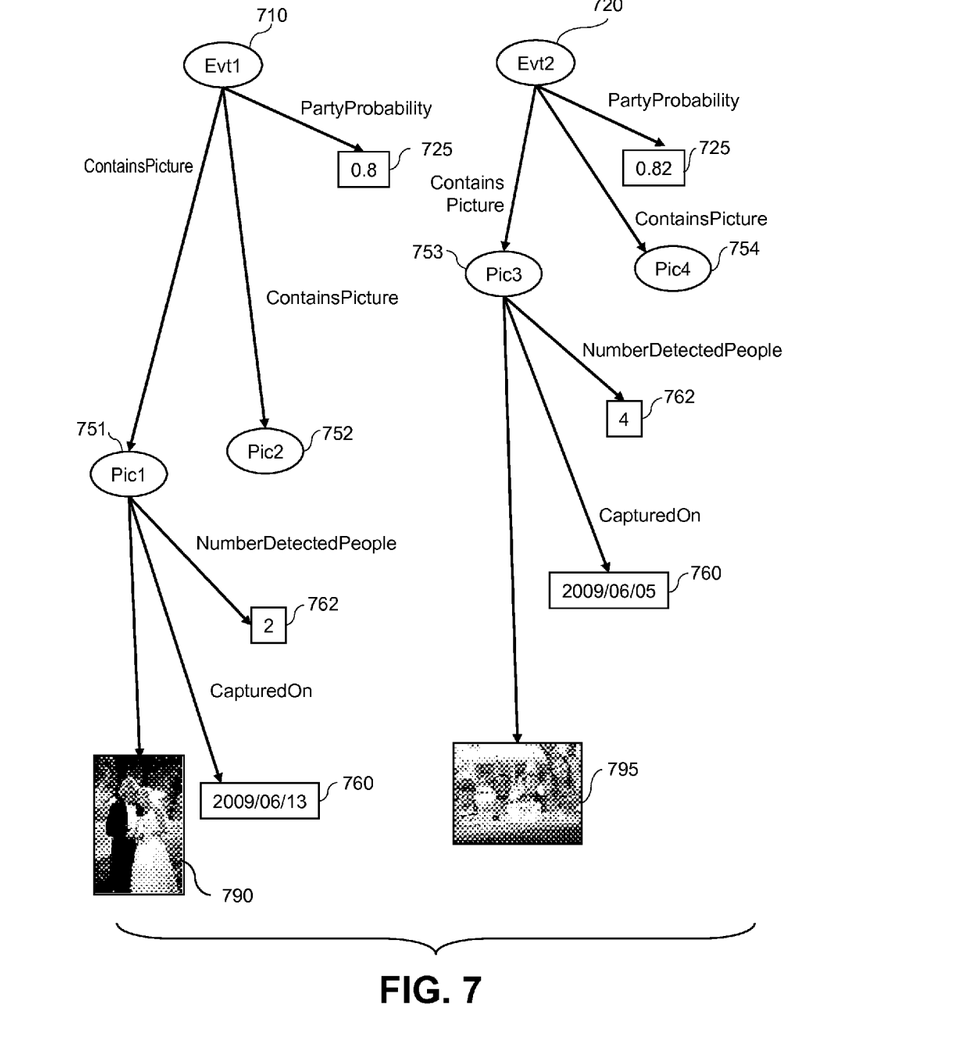
FIG. 7 illustrates some example digital media assets stored in a media storage system and the associated metadata stored in a metadata storage system.

FIG. 7. illustrates some greatly simplified examples of digital media assets stored in a media storage system 150 (FIG. 1), together with associated metadata stored in a metadata storage system 140 (FIG. 1). The data is graphically represented as a semantic network, but those skilled in the art will appreciate that it may be stored and represented using any of a variety of techniques. It should be noted that the figure illustrates only a small fraction of the metadata that typically would be stored with the digital media assets in practice. The media storage system 150 (FIG. 1) is used to store a media collection 200 (FIG. 2) that includes pictures 751, 752, 753 and 754. Each picture will comprise digital image data, together with associated metadata. For example, picture 751 has digital image data 790, which is a wedding scene, and picture 753 has digital image data 795, which is a birthday party scene. Several pieces of metadata are illustrated for pictures 751 and 753 showing the results of running general indexers 205 as part of the index media collection step 210 (FIG. 2). The metadata associated with each picture includes both metadata extracted from the image file (e.g., capture date metadata 760), as well as metadata generated by running various image analysis algorithms (e.g., number of persons metadata 762 generated using a person detector algorithm).

Furthermore, a temporal event clustering algorithm has been used to group pictures into events 710 and 720. Temporal event clustering algorithms typically use the capture date metadata 760, together with an analysis of image similarity to identify groups of images corresponding to a particular event. In this example, event 710 contains pictures 751 and 752, and event 720 includes pictures 753 and 754.

The events 710 and 720 can themselves be considered to be digital media assets. Event media assets will generally include a list of pictures included in the event, and will also have associated metadata. In this example, an event recognition algorithm has been run as a general indexer 205 on the events 710 and 720 and has generated party probability metadata 725, representing the probability that events correspond to party events. (The event recognition algorithm may also generate other probabilities for other event types as well, but those are not shown in the figure.) In this case, the probability of event 710 being a party is shown as 0.8. Likewise, event 720 is shown with a party probability of 0.8.2.

Figure 2:
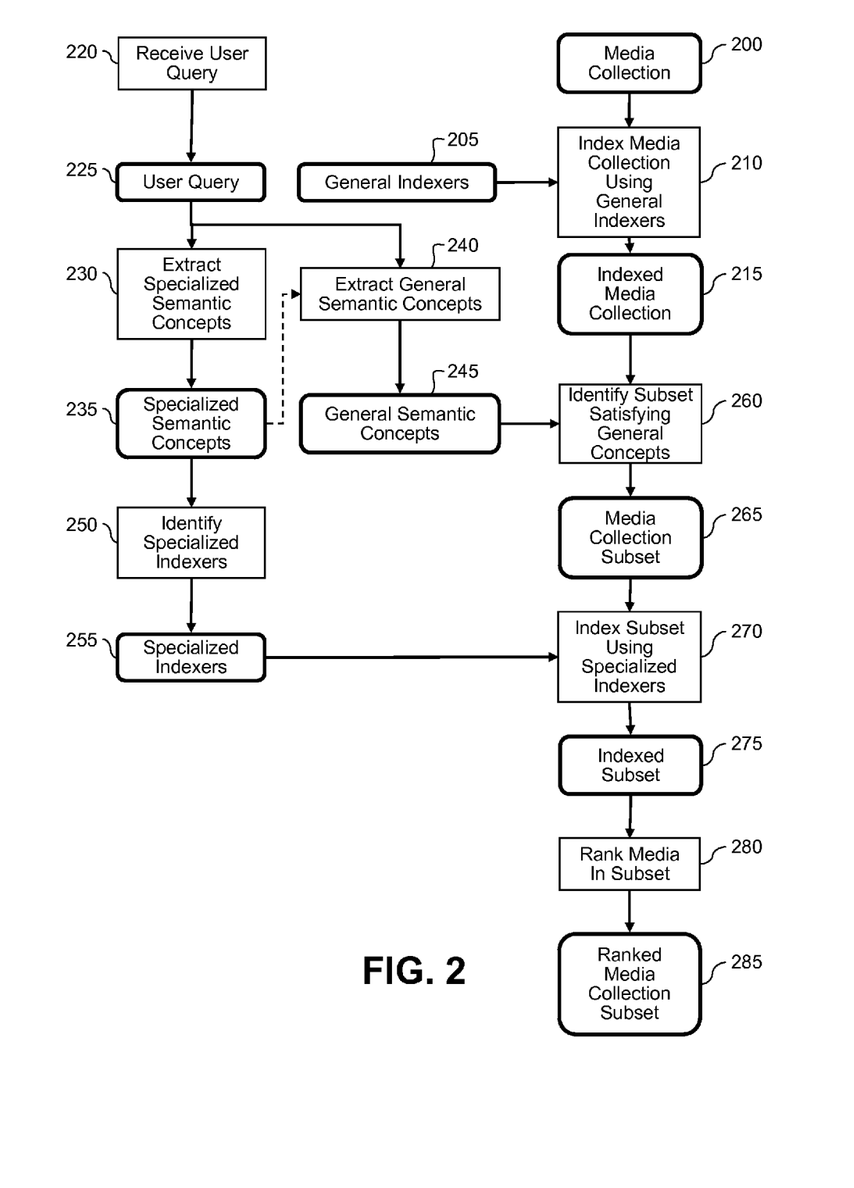
FIG. 2 is a flow diagram illustrating the major steps in receiving and processing media queries according to an embodiment of the present invention.

Returning now to a discussion of FIG. 2, the data processing system 110 (FIG. 1) receives a user query 225 from a user in receive user query step 220. The user query 225 can be received via any one of several methods, including, but not limited to textual input, spoken command or a graphical user interface. In a preferred embodiment, the user is prompted by the system to enter a user query 225. Alternatively, the user query 225 may be automatically or implicitly generated on behalf of the user. For example, the data processing system may interpret an entry on the user's personal calendar as a search term, and retrieve appropriate content for display.

The user who initiates the user query 225 can be the owner of the digital media assets in the media collection 200. Alternately, they can be another user that has access to the digital media assets. For example, a person may capture a series of digital images using a digital camera. The user may then upload the digital images to a website such as the Kodak Gallery™ and share them with other users that might have an interest in the digital images. In this case, the other users can initiate a user query 225 that can be used to search the shared digital images; alternatively, the query 225 can be used to search a virtual media collection that includes both the shared digital images as well as any digital images in the other users' own media collections. In this case, the system may require the other users to be given permission to add metadata generated by the specialized indexers to the shared digital images, or else provision would need to be made for such metadata to be stored in a separate location and associated with the shared digital images.

A given user query 225 can be divided into a set of general and specialized search conditions corresponding to general and specialized semantic concepts. The semantic concepts of interest are those which are detectable by an indexer, or for which there otherwise exists metadata in the metadata storage system indicating that the given semantic concept is a feature of, or is associated with a particular digital media asset. Such metadata, if not generated by an indexer, may also have been explicitly associated with a digital media asset as a user-provided tag.

The term general semantic concepts refers to those semantic concepts for which there is a corresponding general indexer 205; the term specialized semantic concepts refers to those semantic concepts for which there is a specialized indexer 255, or for which there are general indexers 205 or specialized indexers 255 which detect semantically related concepts.

A specialized indexer 255 may be related to one or more general indexers 205, if the corresponding specialized concept is related to the corresponding general concept(s). For example, the concept of "wedding" may be related to the concept of a "party," and the concept of "cat" may be related to the more general concepts of "feline" and "pet." Such relationships may be expressed using an ontology or a database such as the well-known WordNet database developed by George Miller of Princeton University in Princeton, N.J. WordNet defines and represents linguistic relationships such as hypernym, hyponym, synonym, and meronym between concepts in natural language. Given a specialized semantic concept, the system may use mechanisms such as ontologically-based reasoning or WordNet to infer related general semantic concepts. These relationships allow the system to infer relationships between specialized indexers 255 and general indexers 205. Such relationships may enable the system to evaluate queries more efficiently than would otherwise happen apart from this invention, by permitting the system to search for specialized concepts in a reduced subset of the set of digital media assets. The subset of assets against which the specialized indexer 255 should be applied is determined by considering the results of the related general indexers 205, potentially allowing the system to significantly reduce the number of assets for which it needs to run the specialized indexer 255 or test for the specialized semantic concept.

As noted previously, in some cases specialized indexers 255 can simply analyze previously computed metadata to determine their results. In some embodiments, such indexers may even be defined based upon ontological reasoning. For example, a specialized "cat" indexer may in fact be defined by using ontological reasoning to infer that the concept of the domestic cat may be identified as the intersection of a general semantic concept "pet" and a specialized semantic concept "feline."

Given the user query 225, the data processing system extracts specialized semantic concepts 235 from the user query 225 using an extract specialized semantic concepts step 230. In one preferred embodiment, the search query is simply a set of keywords; concepts are then identified as specialized semantic concepts 235 by, for example, a simple table lookup. The same table lookup may also be used to identify general semantic concepts 245 in extract general semantic concepts step 240.

Those skilled in the practice of software development will readily recognize a variety of other ways to map search terms to general semantic concepts 245 and specialized semantic concepts 235. In another embodiment, the user query 225 could be a natural language expression. In this case, the general semantic concepts 245 and specialized semantic concepts 235 are extracted from the user query 225 using techniques commonly practiced by those skilled in natural language processing.

In some embodiments, the system observes the frequency at which certain specialized semantic concepts are queried. Over time, the system may then use these frequencies, perhaps in conjunction with other metrics, such as the computational cost of the indexers, to determine if the corresponding specialized indexers should be made into generalized indexers, which are routinely run on assets. Likewise, the system may evaluate the value of running particular general indexers, and possibly conclude that a general indexer should instead be run as a specialized indexer.

Figure 5:
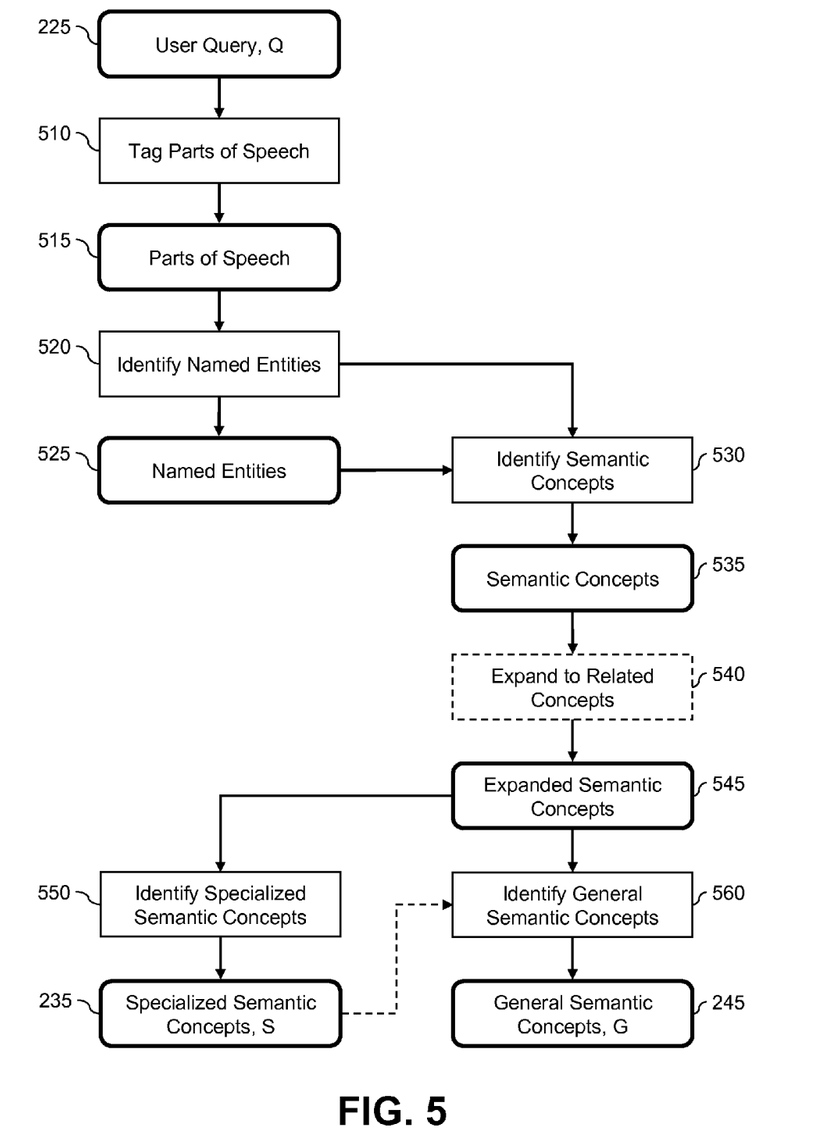
FIG. 5 is a flow diagram illustrating the steps in extracting general and specialized semantic concepts from a query string according to an embodiment of the present invention.

FIG. 5 illustrates one way for interpreting a natural language query according to one embodiment of the present invention. In tag parts of speech step 510, the user query 225 is first processed to identify parts of speech 515, such as nouns, noun phrases and verbs. Named entities 525 such as place names and the names of people are further identified from nouns and noun phrases in identify named entities step 520. The parts of speech 515 and named entities 525 are analyzed to provide a set of semantic concepts 535 in identify semantic concepts step 530.

The set of identified semantic concepts 535 may be further expanded using an optional expand to related concepts step 540 to form a set of expanded semantic concepts 545. The expand to related concepts step 540 can be performed using any techniques for query expansion known in the art. One such technique is described in the article "Concept-based query expansion," by Y. Qiu et al. (Proceedings of the 16th Annual International ACM SIGIR Conference on Research and Development in Information Retrieval, pp. 160-169, 1993). Another technique is described in the article "Web Query Expansion by WordNet," by Z. Gong et al. (16th International Conference on Database and Expert Systems Applications, Lecture Notes in Computer Science 3588, pp. 166-175, 2005). For example, the search term "wedding" could be expanded using a similarity thesaurus to include the equivalent terms "marriage" and "nuptials."

Such expand to related concepts step 540 can be performed in a manner customized to the user. For example, the term "biking" could be known to refer to either motor biking or non-motorized biking, based upon a user's personal preferences, interests and habits. The system could further ask the user via a dialog-based system or some other mechanism to clarify ambiguous terms. As another example, the user may enter a query for the term "Jack," which could refer to a person or a pet. In the absence of any specific metadata identifying an object portrayed within a media asset as Jack, the system could ask the user to clarify whether Jack is a person or animal to determine the appropriate semantic concept. If the user indicates that Jack is a person, the system could then extract the general concept of "person" and the more specific concept of "male."

Next, the set of expanded semantic concepts 545 is processed using an identify specialized semantic concepts step 550 to identify the specialized semantic concepts 235. This step works by identifying any semantic concepts in the set of expanded semantic concepts 545 that do not correspond to the general indexers 205 that were used to index the media collection 200. Likewise an identify general semantic concepts step 560 is used to identify the general semantic concepts 245.

Figure 6:
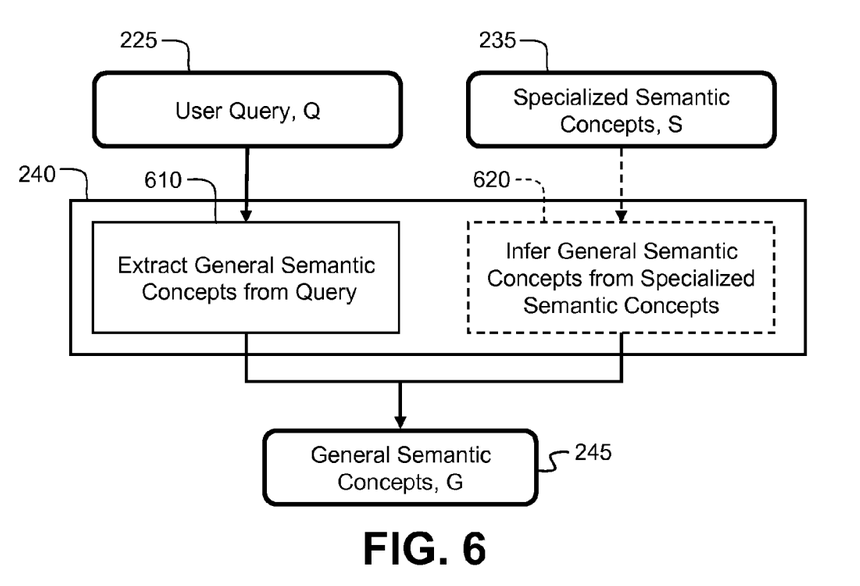
FIG. 6 is a flow diagram illustrating additional details for the extract general semantic concepts step of FIG. 2 according to an embodiment of the present invention.

The set of general semantic concepts 245 can be determined in several different ways. Referring to FIG. 6, an example is given where extract general semantic concepts step 240 of FIG. 2 is broken down into two steps. (These same steps can be used in the identify general semantic concepts step 560 of FIG. 5.) In extract general semantic concepts step 610, the data processing system extracts general semantic concepts 245 directly from the user query 225. An optional infer general semantic concepts step 620 uses previously extracted specialized semantic concepts 235 to infer additional general semantic concepts 245. For example, a term "marriage" in the user query 225 would be used to identify the specialized semantic concept 235 "wedding." The infer general semantic concepts step 620 is used to map this specialized semantic concept 235 to one or more corresponding general semantic concepts 245, where satisfaction of the specialized semantic concept 235 by a given digital media asset is dependent upon the digital media asset also satisfying the more generalized concept. In evaluating the search, the system will need to apply a corresponding specialized indexer 255 to digital media assets in the media collection, but rather than applying the specialized indexer 255 to all of the digital media assets, the system need only apply the specialized indexer 255 to those digital media assets that satisfy a corresponding generalized indexer. (A generalized indexer is a general indexer for which the detected concept is a generalization of one or more specific concepts known to the system.) In some embodiments, the system may include one or more specialized indexers corresponding to the specific semantic concepts, but the presence of such indexers is not required.

Figure 8:
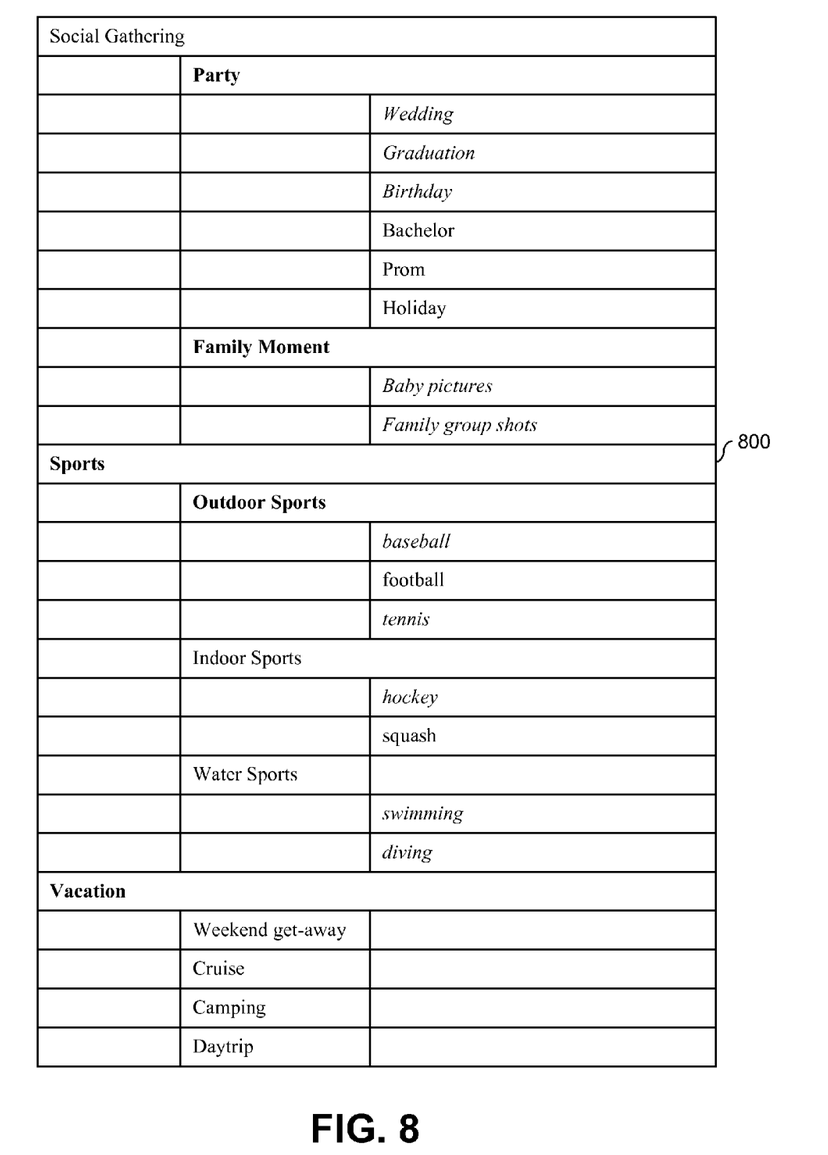
FIG. 8 is a table showing a sample concept ontology.

FIG. 8 illustrates a sample concept ontology 800, containing the top-level semantic concepts of "social gathering," "sports" and "vacation." A specialized semantic concept such as "wedding" may be mapped to one or more corresponding higher-level semantic concepts for which a general indexer 205 may exist. According to the sample ontology 800, the semantic concept "wedding" is a type of "party" which in turn is a type of "social gathering." A given instance of the system may implement only a subset of the possible general indexers 205. A particular system might only include general indexers 205 corresponding to the semantic concepts shown in bold in FIG. 8. In this example, the semantic concept "wedding" would then map to the general semantic concept "party." According to this ontology, any digital media asset classified as a "wedding" should also be classified as a "party;" therefore in searching for wedding images, the system need only consider those images classified as party images.

As noted previously, some indexers may output values with an associated confidence or probability. Moreover, the results of some indexers may be computed relative to some other related digital media asset, and then applied to other digital media assets. In the example of FIG. 7, the semantic concept of "party" is computed at the level of an event-type digital media asset. Semantic concepts applied to one digital media asset may be inferred to apply to other digital media assets. For example, event digital media assets may contain one or more digital media assets. A concept such as "party" applied to the event digital media asset may be assumed to apply to all digital media assets contained by the event digital media asset.

In the example of FIG. 7, the system incorporates a party detector as a general indexer 205, which was run as part of the index media collection step 210 (FIG. 2). Note that the party detector may be run as part of a more general event type classifier, where "party" is just one of the possible high-level concepts that may be returned by the classifier, or the party detector may be a separate indexer.

Returning now to a discussion of FIG. 2, in the extract general semantic concepts step 240, the system extracts general concepts 245 from the user query 225. For the example illustrated in FIG. 7, given the query, "wedding 2009," the extract general semantic concepts step 240 would extract the general concepts "party" and "2009" from the query of "wedding 2009." The year 2009 may be interpreted as meaning digital content captured or created in the year 2009. In a preferred embodiment, the term "wedding" is mapped to the term "party" by consulting an ontology such as the example concept ontology 800 shown in FIG. 8. In this example ontology, "party" is the least general concept containing the concept "wedding" for which a corresponding general indexer 205 is present.

In identify specialized indexers step 250, the system identifies specialized indexers 255 that need to be run in order to evaluate the query. FIG. 8 shows in italics the set of specialized indexers 255 assumed to be present in the example system. In this example, the system includes a specialized indexer 255 directly corresponding to the semantic concept of "wedding." Note that there may not be a one-to-one match between the extracted specialized semantic concepts and the available specialized indexers 255. For example, consider the semantic concept "water sports." According to FIG. 8, the example system includes an indexer for the general semantic concept of "sports" and specialized indexers 255 for the semantic concept of "swimming" and "diving," but does not include an indexer for the semantic concept of "water sports." One can infer from the concept ontology 800 that the target semantic concept of "water sports" can be tested by testing for the semantic concepts of "swimming" or "diving." However, a semantic concept such as "water sports" may include other semantic concepts not covered by the concept ontology 800. In testing for such semantic concepts, the system may take one of two approaches: it may use either a closely related, more general semantic concept, such as "sports," or it may go with the union of the most closely related, more specialized semantic concepts contained by the target semantic concept, in this case, "swimming" and "diving." Of course, the former approach may include more results than appropriate while the latter approach may fail to return all appropriate results.

As another example, the user may specify a search term such as "wheels." The system may not have a generalized car indexer and a specialized wheel indexer, but instead may have a specialized indexer 255 which detects objects that typically contain wheels, such as a car indexer. In this case, the system may use ontological reasoning to determine that a wheel is a part (or meronym) of a car. In this case, the car indexer may be used as a substitute for a wheel indexer, although again it may suffer both in precision and recall, as wheels are also parts of other objects, and not all car pictures may show the wheels.

Similarly, a generalized semantic concept 245 may not have been previously indexed by a corresponding general indexer 205, but is readily expressible as a simple constraint or function over the results of other general indexers 205. For example, a social gathering is easily detected by searching for images containing two or more people. As another example, the system may include indexers for the semantic concepts "pet" and "feline," where the feline concept detects any member of the feline family, including domesticated cats, jaguars and lions. If the user searches for the semantic concept of "cat," the system identifies either one of the general indexers 205, "pet" or "feline" as being applicable. Note that these concepts are used purely for illustrative purposes and are not meant to be suggestive of what indexers might exist in practice.

Given the set of generalized semantic concepts 245, the digital processing system uses identify subset step 260 to identify a media collection subset 265, which is the subset of the indexed media collection 225 that satisfies the general semantic concepts 245. Continuing the earlier example, and given the user query 225 "wedding 2009," the media collection subset 265 would include all images captured in 2009 and belonging to an event classified as "party." Probabilistic data may be mapped to non-probabilistic data using, for example, thresholds (e.g., data having a probability greater than 50%). In some embodiments, the system will preserve the probabilistic data throughout the ranking process, using techniques known to those skilled in the art for working with probabilistic or imprecise data.

In the case where multiple general semantic concepts 245 may have been applicable, as in the example where the system includes general indexers 205 for the concepts "pet" and "feline" and is given the search term "cat," the identify subset step 260 should use the general semantic concept 245 that is associated with the smaller number of images. For example, if the system has associated the semantic concept "feline" with a smaller number of images than the semantic concept "pet," then the identify subset step 260 would identify the media collection subset 265 as being the set of digital media assets satisfying the "feline" semantic concept.

In index subset step 270, the system then indexes the media collection subset 265 using the specialized indexers 255 identified in identify specialized indexers step 250 to form an indexed subset 275. Continuing the wedding example, the wedding indexer would be run against the media collection subset 265, including pictures 751 and 753 (FIG. 7). An accurate wedding indexer would return "true" in the case of a binary classifier, or a high probability in the case of a probabilistic classifier, for picture 751, but would return "false," or a low probability, for picture 753. Any specialized metadata generated by the specialized indexers 255 will be used to evaluate the digital media assets in the media collection subset 265 against the user query 220. Additionally, the specialized metadata can be associated with the digital media assets stored in the media collection 200. For example, the specialized metadata can be stored as tags in digital image files. In this case, if a future user query is ever executed that requires the same specialized indexers, it would only be necessary to evaluate the specialized indexers for those digital media assets not having the specialized metadata.

In rank media step 280, the system computes a ranked media collection subset 285 by considering the indexed subset 275. Continuing the example, rank media step 280 would rank picture 751 higher than picture 753 in the case of a probabilistic classifier. Alternatively, in the case of a binary classifier, picture 751 would be included among the results, but picture 753 would not be included.

Generally, the rank media step 280 will base its ranking on specialized metadata produced by the specialized indexers 255. Optionally, it can also base its ranking on the results of the general metadata corresponding to the general semantic concepts 245. For example, the party probability metadata 725 can be used to rank the images having a higher probability higher than images having a lower probability.

The results of the rank media step 280 may be displayed back to the user using any of a variety of manners, depending on the implemented user interface. They may be displayed in a list fashion, either as a list of filenames or icons, or in any manner appropriate to the medium, as the result may be of one or more media types, such as still images, audio, or events. If the digital media assets are digital images, the digital media assets can be presented to the user by displaying the digital images. For the case where the digital media assets are digital video files, the digital media assets can be presented to the user by displaying key frames or by playing the digital video files. In one embodiment of the present invention, the entire ranked media collection subset 285 can be included in the list. Alternately, the list can contain only the most highly ranked digital media assets. In an alternate embodiment of the present invention, the results of the rank media step 280 may be further used by some containing application, such as displayed on a calendar as an iconic representation to go with a user-provided calendar entry.

Those skilled in the art will recognize that the various steps of FIG. 2 may be implemented in a variety of different orders without impacting the final results, and that some steps may be done in parallel.

A computer program product can include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

PARTS LIST

110 Data processing system
120 Indexers
130 User interface system
140 Metadata storage system
150 Media storage system
160 Peripheral system
170 Data storage system
200 Media collection
205 General indexers
210 Index media collection step
215 Indexed media collection
220 Receive user query step
225 User query
230 Extract specialized semantic concepts step
235 Specialized semantic concepts
240 Extract general semantic concepts step
245 General semantic concepts
250 Identify specialized indexers
255 Specialized indexers
260 Identify subset step
265 Media collection subset
270 Index subset step
275 Indexed subset
280 Rank media step
285 Ranked media collection subset
300 Start indexing step
310 More indexers test
320 Run next indexer step
325 Indexer metadata
330 Write indexer metadata step
340 Done indexing step
400 Metadata table
510 Tag parts of speech step
515 Parts of speech
520 Identify named entities step
525 Named entities
530 Identify semantic concepts step
535 Semantic concepts
540 Expand to related concepts step
545 Expanded semantic concepts
550 Identify specialized semantic concepts step
560 Identify general semantic concepts step
610 Extract general semantic concepts step
620 Infer general semantic concepts step
710 Event
720 Event
725 Party probability metadata
751 Picture
752 Picture
753 Picture
754 Picture
760 Capture date metadata
762 Number of persons metadata
790 Digital image data
795 Digital image data
800 Concept ontology

The invention claimed is:

1. A method for searching a database of digital media assets, comprising:
   a processor receiving a search query;
   the processor analyzing the search query to extract a specialized search condition corresponding to a specialized semantic concept;
   the processor selecting, from a pre-existing ontology of indexers, a specialized indexer based on a determination that the selected specialized indexer can be used to identify digital media assets that correspond to the specialized semantic concept;
   the processor analyzing the search query to extract a general search condition corresponding to a related higher level semantic concept;
   the processor identifying, from a database of digital media assets, a subset of digital media assets that satisfy the general search condition responsive to general metadata for each of the digital media assets;
   the processor applying the selected specialized indexer to the subset of digital media assets to determine specialized metadata for a digital media asset in the subset of digital media assets, wherein the specialized metadata provides an indication of whether the digital media asset corresponds to the specialized semantic concept; and
   the processor converting the specialized indexer into a general indexer based at least on a frequency with which the specialized semantic concept is queried, wherein the processor is configured to convert the specialized indexer into the general indexer based further on a computational cost associated with the specialized indexer,
   wherein the general indexer is applied to the digital media assets independent of a search query, wherein the general indexer is operable to identify a digital media asset that corresponds to a higher level semantic concept and determine the general metadata for the identified digital media asset based at least upon an analysis of pixel data associated with the digital media asset, and wherein the general metadata provides an indication of the higher level semantic concept to which the identified digital media asset corresponds.

2. The method of claim 1 further comprising ranking the subset of the digital media assets according to their satisfaction of the general search condition responsive to the general metadata.

3. The method of claim 1 wherein an element of the search query corresponds to both a general indexer and a specialized indexer.

4. The method of claim 1 wherein the specialized metadata is associated with the digital media assets and stored in the database of digital media assets.

5. The method of claim 1 wherein the specialized metadata already exists for a portion of the subset of the digital media assets, and wherein the specialized indexer is only applied to digital media assets not having the specialized metadata.

6. The method of claim 1 wherein the search query is received from a user.

7. The method of claim 1 wherein general search conditions are identified from elements of the search query by using concept expansion.

8. The method of claim 1 wherein specialized search conditions are identified from elements of the search query by using concept expansion.

9. The method of claim 6 further comprising:
ranking the subset of the digital media assets according to their satisfaction of the specialized search condition responsive to the specialized metadata; and
presenting the most highly ranked set of digital media assets.

10. The method of claim 9 wherein the digital media assets are digital images and the digital media assets are presented by displaying the digital images.

11. The method of claim 9 wherein the digital media assets are digital video files and the digital media assets are presented by playing the digital video files.

12. The method of claim 9 wherein the digital media assets are digital audio files and the digital media assets are presented by playing the digital audio files.

13. The method of claim 9 wherein the digital media assets are complex objects composed of a plurality of digital images, digital videos or digital audios.

14. The method of claim 1 wherein the general metadata includes date/time metadata, event classification metadata, indoor/outdoor metadata, person detection metadata or geospatial metadata.

15. The method of claim 1 wherein the specialized metadata is a meronym of a generalized metadata term.

16. The method of claim 1 wherein a portion of the general metadata or the specialized metadata are specified by probability values.

17. The method of claim 16 further comprising using the probability values to rank the subset of the digital media assets.

18. The method of claim 1 further comprising presenting a query requesting additional information to clarify the search query.

19. The method of claim 18 wherein the query requests clarification of ambiguous elements of the search query.

20. The method of claim 1 wherein the general indexer is included in a set of general indexers, and wherein the set of general indexers is modified over time in response to a frequency at which search queries are executed containing elements corresponding to each indexer in the set of general indexers.

21. The method of claim 1, wherein specialized search indexers are applied to digital media assets only in response to particular search queries.

22. The method of claim 1, further comprising:
ranking the subset of the digital media assets according to their satisfaction of the general search condition based on the general metadata; and
ranking the subset of the digital media assets according to their satisfaction of the specialized search condition based on the specialized metadata.

23. The method of claim 1, wherein analyzing the search query to extract a general search condition comprises selecting general indexers from the pre-existing ontology, and wherein the pre-existing ontology relates the general indexers to the selected specialized indexers.

24. The method of claim 1, further comprising selecting a second specialized indexer based on a determination that the pre-existing ontology relates the second specialized indexer to the selected specialized indexer.

25. The method of claim 1, wherein the pre-existing ontology comprises user-specific ontological relationships.

26. A system comprising:
a data processor; and
a memory communicatively connected to the data processor and storing instructions configured to cause the data processor to perform operations comprising:
receiving a search query;
analyzing the search query to extract a specialized search condition corresponding to a specialized semantic concept;
selecting, from a pre-existing ontology of indexers, a specialized indexer based on a determination that the selected specialized indexer can be used to identify digital media assets that correspond to the specialized semantic concept;
analyzing the search query to extract a general search condition corresponding to a related higher level semantic concept;
identifying, from a database of digital media assets, a subset of digital media assets that satisfy the general search condition responsive to general metadata for each of the digital media assets;
applying the selected specialized indexer to the subset of digital media assets to determine specialized metadata for a digital media asset in the subset of digital media assets, wherein the specialized metadata provides an indication of whether the digital media asset corresponds to the specialized semantic concept; and
the processor converting the specialized indexer into a general indexer based at least on a frequency with which the specialized semantic concept is queried, wherein the processor is configured to convert the specialized indexer into the general indexer based further on a computational cost associated with the specialized indexer;
wherein the general indexer is applied to the digital media assets independent of a search query, wherein the general indexer is operable to identify a digital media asset that corresponds to a higher level semantic concept and determine the general metadata for the identified digital media asset based at least upon an analysis of pixel data associated with the digital media asset, and wherein the general metadata provides an indication of the higher level semantic concept to which the identified digital media asset corresponds.

27. A non-transitory computer readable medium having stored thereon instructions executable by a processor to cause the processor to perform functions comprising:
receiving a search query;
analyzing the search query to extract a specialized search condition corresponding to a specialized semantic concept;
selecting, from a pre-existing ontology of indexers, a specialized indexer based on a determination that the selected specialized indexer can be used to identify digital media assets that correspond to the specialized semantic concept;
analyzing the search query to extract a general search condition corresponding to a related higher level semantic concept;
identifying, from a database of digital media assets, a subset of digital media assets that satisfy the general search condition responsive to general metadata for each of the digital media assets;
applying the selected specialized indexer to the subset of digital media assets to determine specialized metadata for a digital media asset in the subset of digital media assets, wherein the specialized metadata provides an indication of whether the digital media asset corresponds to the specialized semantic concept; and converting the specialized indexer into a general indexer based at least on a frequency with which the specialized semantic concept is queried, wherein the processor is configured to convert the specialized indexer into the general indexer based further on a computational cost associated with the specialized indexer, wherein the general indexer is applied to the digital media assets independent of a search query, wherein the general indexer is operable to identify a digital media asset that corresponds to a higher level semantic concept and determine the general metadata for the identified digital media asset based at least upon an analysis of pixel data associated with the digital media asset, and wherein the general metadata provides an indication of the higher level semantic concept to which the identified digital media asset corresponds.

* * * * *